Nov. 5, 1957      B. V. B. BRAKER      2,811,894
TELESCOPIC SIGHT FOR DIRECT FIRE GUNNERY
Filed Dec. 31, 1954      6 Sheets-Sheet 3
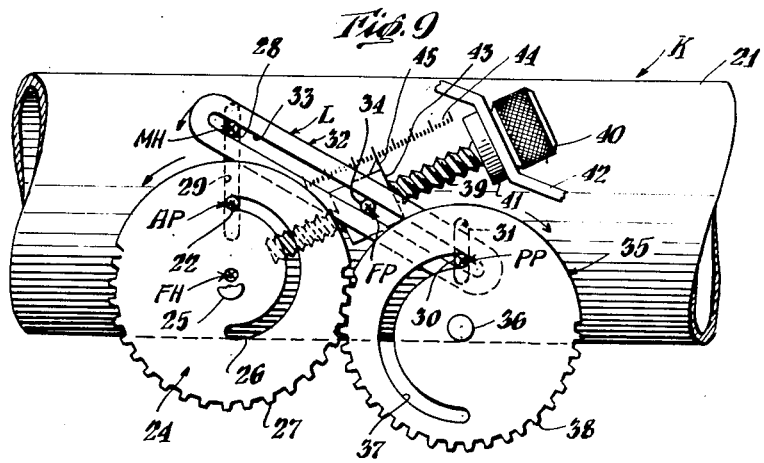
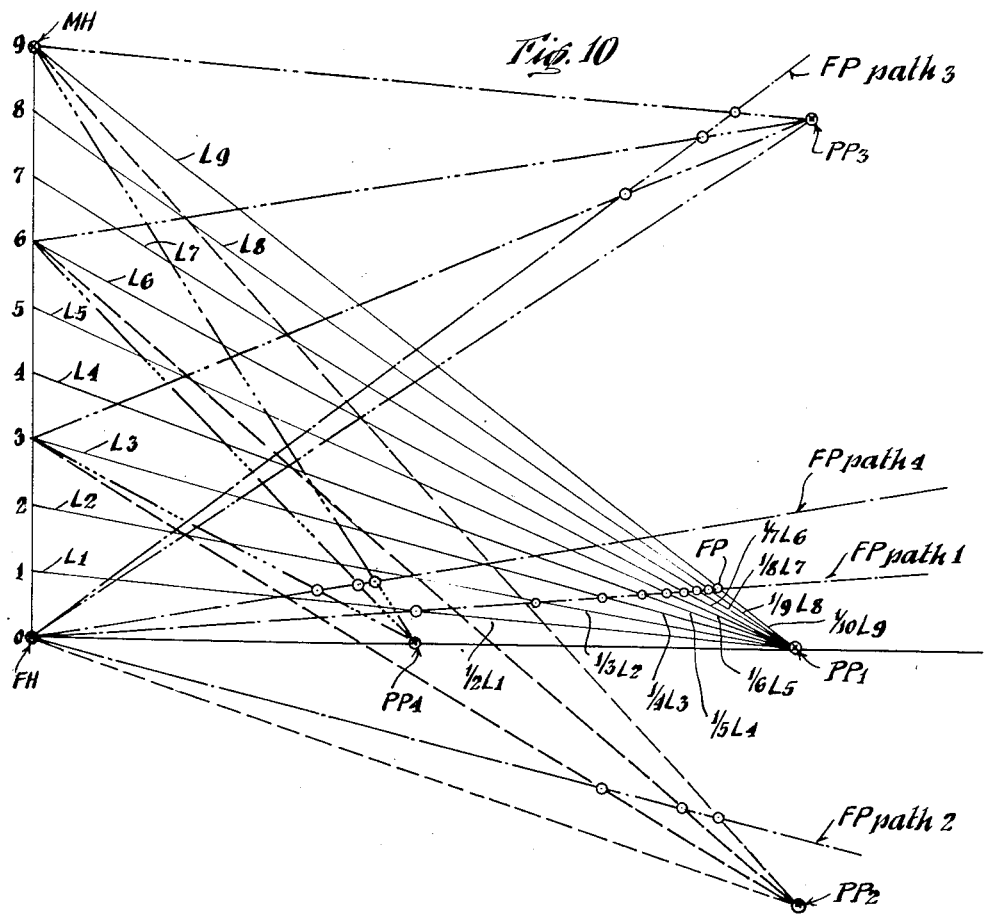

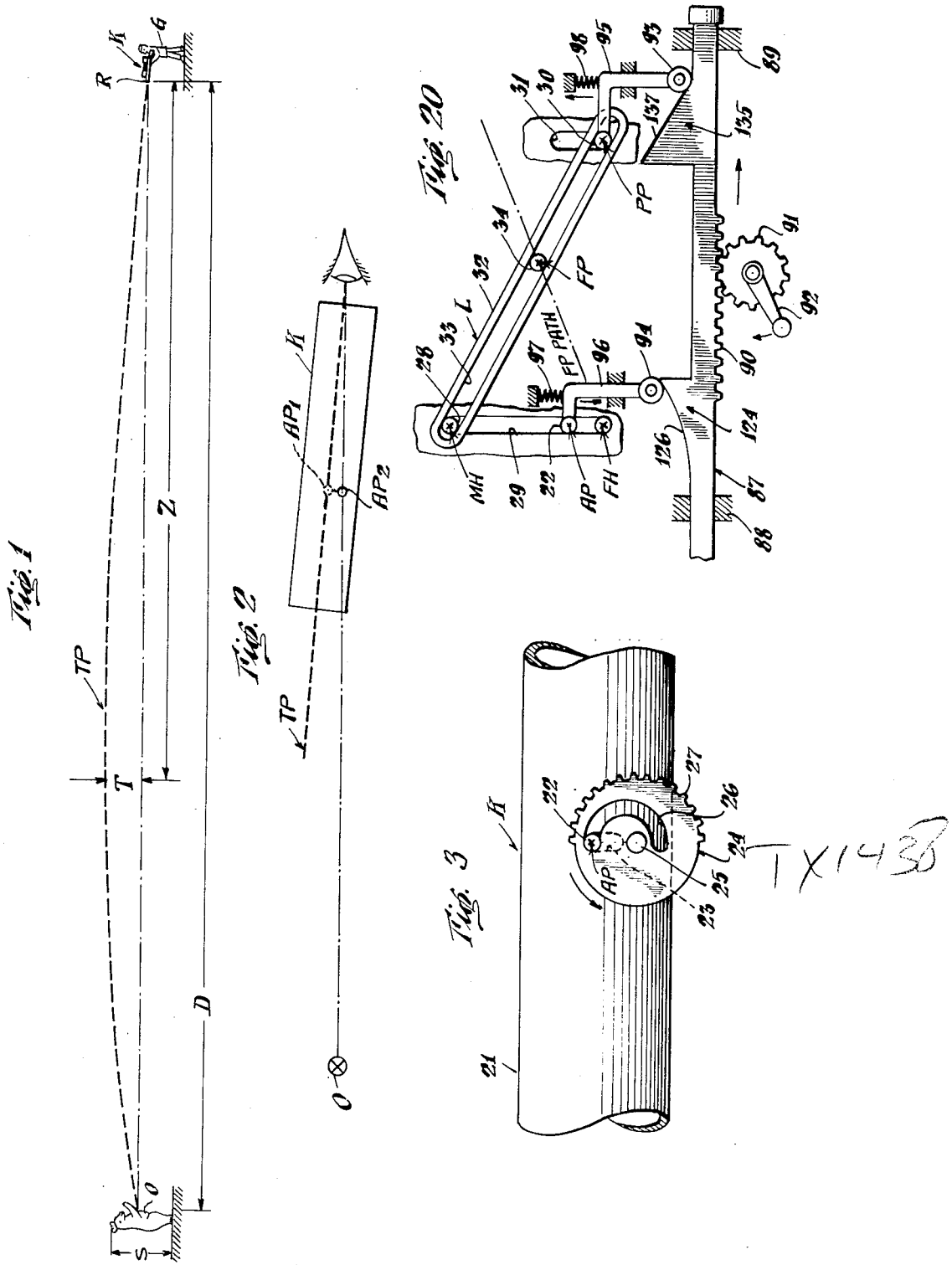

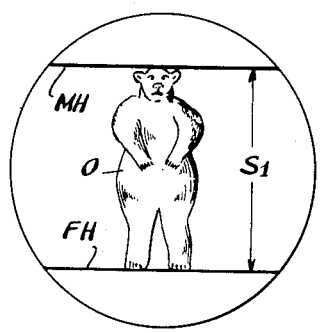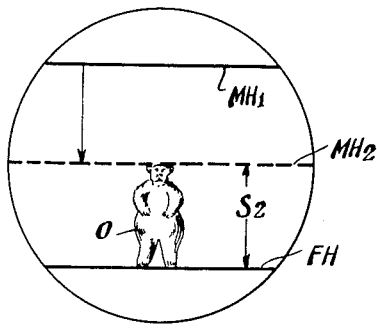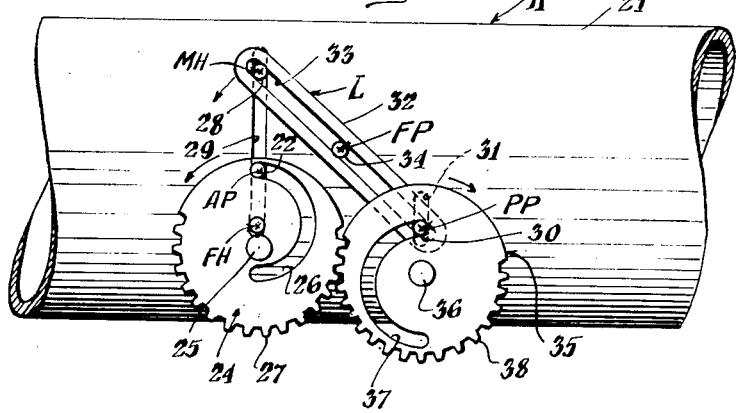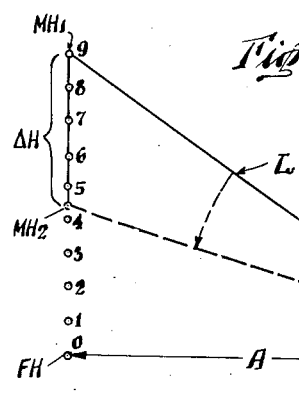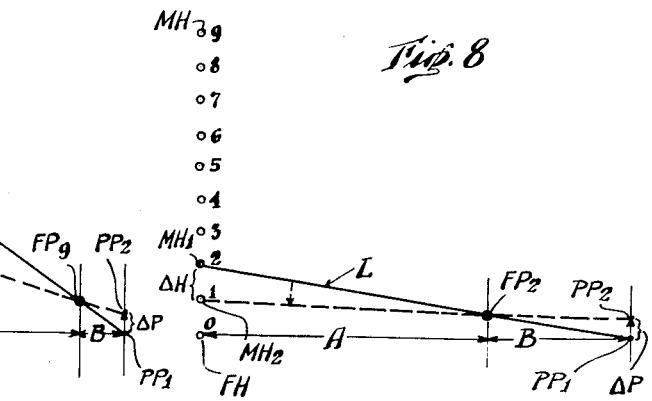

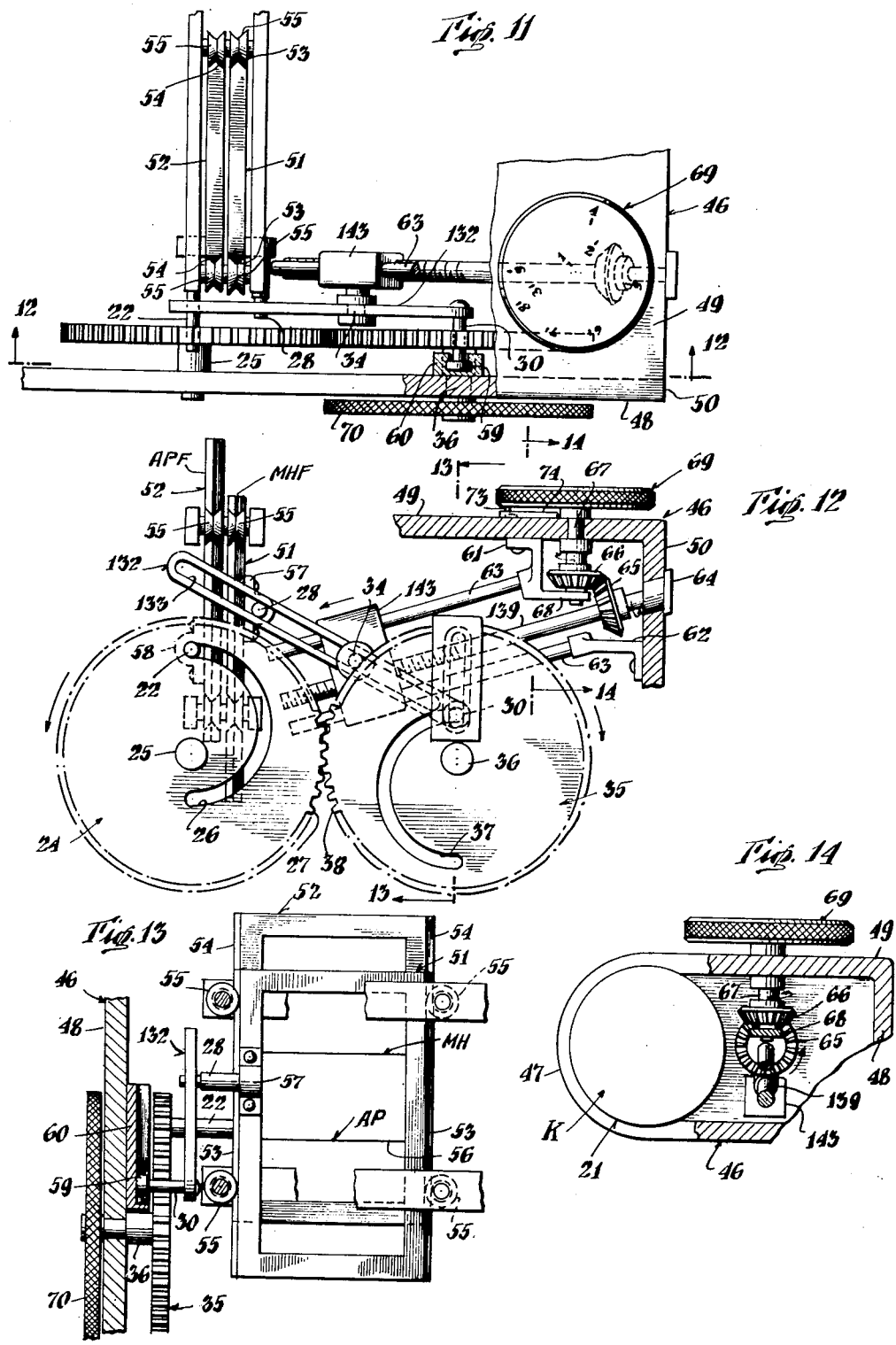

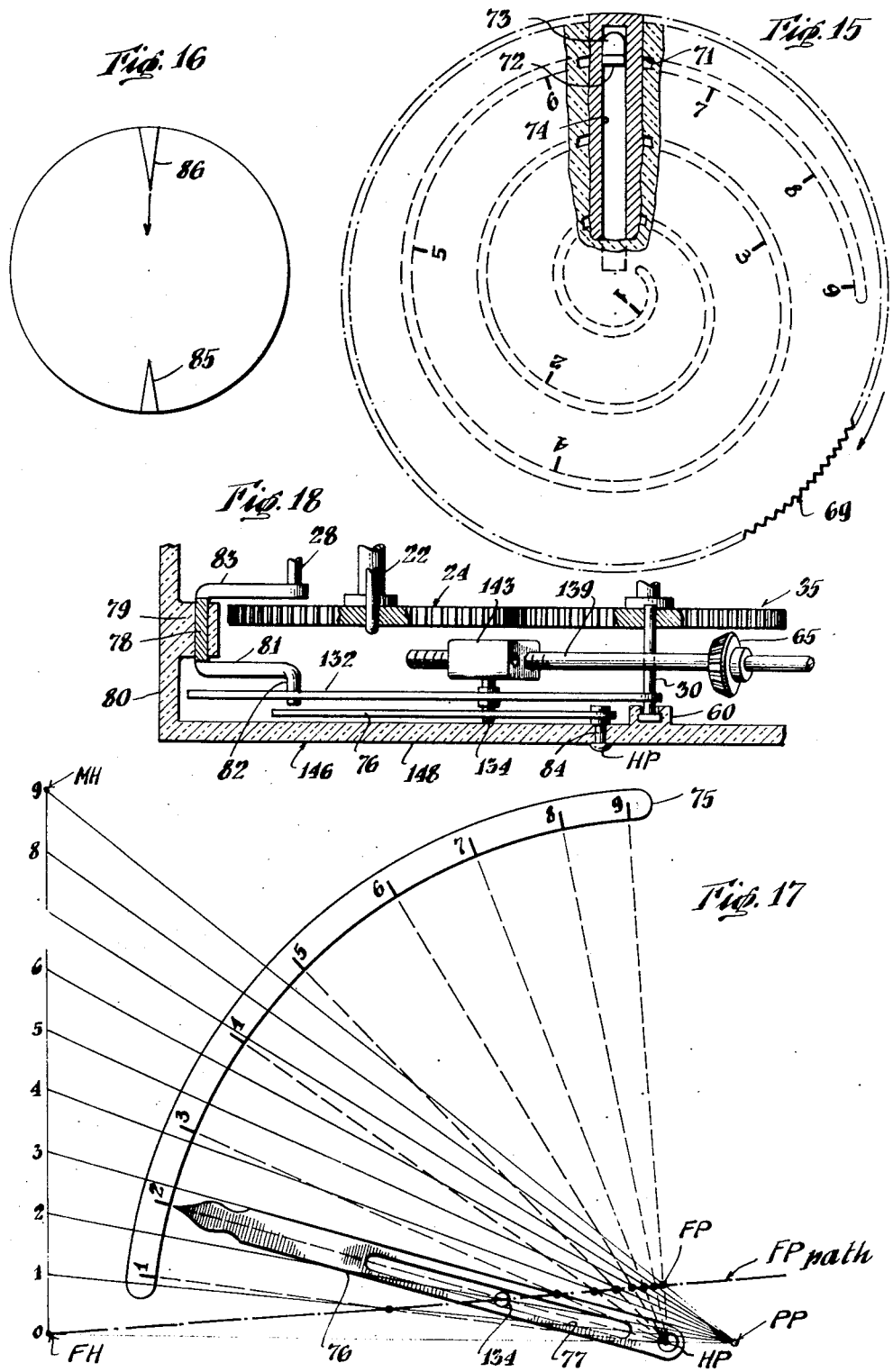

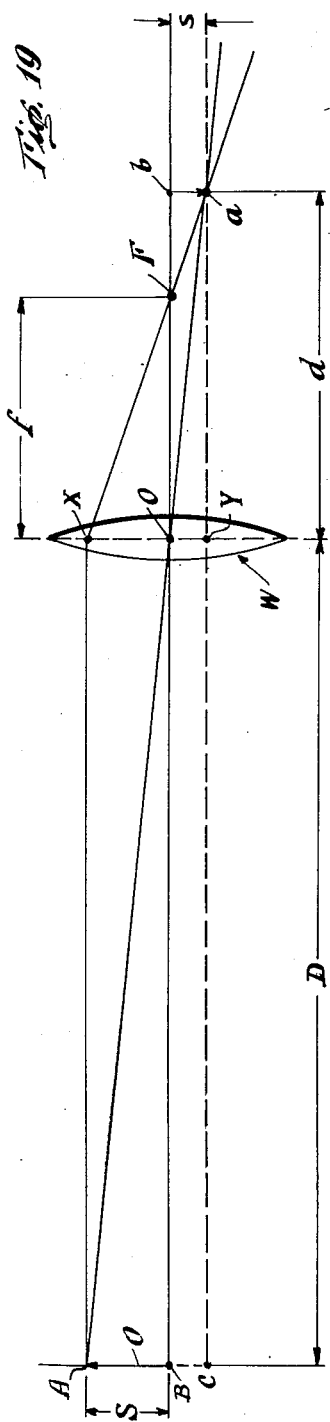
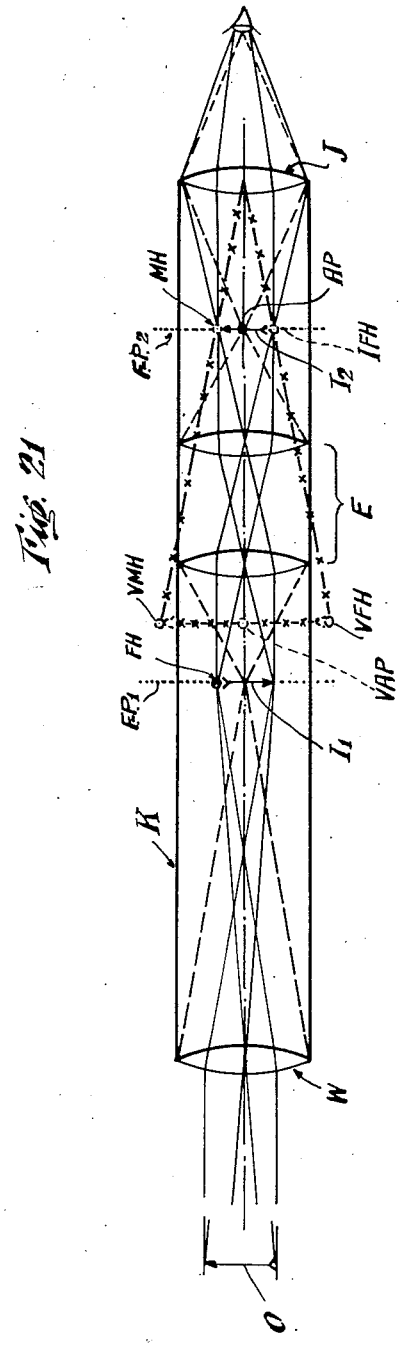

United States Patent Office 2,811,894
Patented Nov. 5, 1957

2,811,894

TELESCOPIC SIGHT FOR DIRECT FIRE GUNNERY

Benjamin V. B. Braker, Centerport, N. Y.

Application December 31, 1954, Serial No. 479,210

12 Claims. (Cl. 88—32)

The present invention relates to improvements in telescopic sights for direct fire gunnery being particularly adapted for use in riflescopes for firearms although not limited thereto.

A general object of the present invention is to provide such a telescopic sight in which framing reticle means are mounted with one being manually adjustable relative to another to frame the image of a target at unknown range by unique and novel operating means, in association with an incorporated aiming point reticle means capable of being lowered or raised by operation of the same operating means automatically to accommodate trajectory efficiently; said device also preferably being manually adjustable with respect to different characteristic heights of target of known typical sizes. An important feature of the device is the extreme simplicity, the rapidity and the accuracy with which such adjustments can be made even under stress of excitement, and without requiring complex mental calculations and reference to mathematical tables.

A more specific object of the present invention is to provide such a telescopic sight in which a movable framing reticle means, in the form of a point, cross hair or the like, is movable by manually operated mechanism relative to another such framing reticle means which is relatively fixed in position to frame the image of a target at unknown range, the trajectory at the unknown range being automatically accommodated with assurance so that the missile will be directed to the kill point as marked by a movable aiming point in the telescopic sight, the aiming point being moved for such accommodation of trajectory by mechanism coupled to and synchronized with the framing reticle mechanism; the rate of framing motion of the movable framing reticle means being readily alterable manually in a simple pre-shoot manner effectively adapting the automatic adjustment of the aiming point to targets of known different heights.

Another object of the present invention is to provide in such a telescopic sight easily read index means to direct with accuracy the pre-shoot adjustment of the rate of framing motion of the movable framing reticle means to the known average height of a particular selected target whereby subsequent framing action of the sight mechanism correctly adjusts the position of the aiming point to assure a proper hit.

A further object of the present invention is the provision of structural embodiments of the device which are readily constructed and assembled and permit efficient use and operation thereof.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

Fig. 1 is a schematic and diagrammatic representation of use of a riflescope embodiment of the present invention as employed in connection with a firearm, such as a hunting rifle, in properly directing the missile to the kill point of a distant target at unknown range, with accommodation of the trajectory characteristics of the firearm;

Fig. 2 is a schematic and diagrammatic representation of the principle of properly accommodating trajectory by adjustment of the aiming point in such a telescopic sight;

Fig. 3 is a side elevational schematic view, with parts broken away, of a telescopic sight barrel equipped with cam means employable in an embodiment of the present invention for attaining adjustment of the aiming point depicted in Fig. 2;

Fig. 4 is a schematic view of an image field which may appear in the embodiment of the telescopic sight of the present invention in the circumstances depicted in Fig. 1, illustrating the framing of the target by the framing reticle means at the range at which the device is zeroed in, such as at one hundred yards for a hunting rifle;

Fig. 5 is a schematic showing similar to Fig. 4, illustrating the observed image field for the same target when located at a greater range and the adjustment of the movable framing reticle means relative to the relative fixed framing means for proper framing of the smaller image;

Fig. 6 is a side elevational schematic view, with parts broken away, of mechanism of an embodiment of the present invention showing association with the cam mechanism illustrated in Fig. 3 to accomplish simultaneously the aiming point adjustment illustrated in Fig. 2 and the framing reticle adjustment illustrated in Fig. 5;

Fig. 7 is a digrammatic showing of the geometrical relationships of parts of the mechanism employed in Fig. 6 to accomplish adjustment of the framing reticle means for properly framing the target at a range greater than that at which the device is zeroed in;

Fig. 8 is a diagrammatic showing similar to Fig. 7 showing the geometrical relationship of parts of the mechanism for adjusting the framing reticle means for targets of heights typically different from that of the target for which the device is pre-shoot set to provide the geometrical relationships illustrated in Fig. 7;

Fig. 9 is a side elevational schematic view, with parts broken away, of mechanism embodying the parts illustrated in Fig. 6, together with additional parts to attain the target height adjustment illustrated in Fig. 8;

Fig. 10 is a diagrammatic illustration of the geometrical relationships of the relatively fixed framing reticle means, the movable framing reticle means and a third point hereinafter called the "power point," illustrating how these three points dictate the path of adjustment of the means for pre-shoot setting of the mechanism for typical targets of different known heights;

Fig. 11 is a top plan view, with parts broken away and in section, of an embodiment of the mechanism schematically illustrated in Fig. 9, showing one form of index means which may be employed to attain the adjustment for typically different targets of known heights;

Fig. 12 is a side elevational view, with parts broken away and in section, of the device shown in Fig. 11;

Fig. 13 is a sectional view, with parts broken away, taken substantially on line 13—13 of Fig. 12;

Fig. 14 is a sectional view, with parts broken away, taken substantially on line 14—14 of Fig. 12;

Fig. 15 is an enlarged plan view of the index means illustrated in Figs. 11 and 12;

Fig. 16 is a schematic view of the field of vision of another embodiment of the telescopic sight of the present invention differing chiefly from that illustrated in the preceding figures in the employment of a different type of framing reticle means;

Fig. 17 is a side elevational view of parts of a different embodiment of the index means showing in diagram the geometrical relationship thereof to one of the conditions depicted in Fig. 10;

Fig. 18 is a lateral sectional view, with parts broken away, of mechanism of the type illustrated in Figs. 11 to 14 incl. altered in certain respects to permit employment of the index means illustrated in Fig. 17;

Fig. 19 is a diagrammatic view of the optical principles of an objective of a telescopic sight of the present invention for reference in explaining the fundamental principles of operation of the present device and embodiments thereof;

Fig. 20 is a side elevational schematic view, with parts broken away, similar in many respects to Fig. 9 and illustrating the principles of a different embodiment of the invention; and Fig. 21 is a diagrammatic illustration of the optical system of a telescopic sight of the present invention which employs an objective, an eye-piece lens means and an intervening erector lens assembly illustrating the possibility of locating reticle means of the telescopic sight in either of the two focal planes.

Referring to the drawings, like reference characters identify similar parts throughout and the principles of the device of the present invention will be best understood by brief reference to fundamentals of accommodating trajectory, as illustrated in Figs. 1 and 2, and the framing of the target by reticle means, as illustrated in Figs. 4 and 5, as functions of mechanism respectively schematically illustrated in Fig. 3 and Fig. 6.

As schematically and diagrammatically shown in Fig. 1, the hunter G, having a firearm or rifle R suitably equipped with an embodiment of the telescopic sight K of the present invention, may sight the gun with the use of the sight at a target O at a range D, the target having a real height S. As known to those skilled in the ballistics art and as illustrated in Fig. 1, the missile or rifle bullet, in travelling to the target O, arches or has a curved trajectory path TP, indicated in dotted lines, which has its greatest trajectory or height T above a straight line of sight from G to O, indicated by a dot-dash line, at a point Z from the hunter which may be about 5/8 of the range D for a particular rifle. Thus, should the bore of the rifle R be aimed along the straight dot-dash line to the target O, the missile, in travelling to the target, would drop through and appreciably more than the trajectory distance T and thus would not strike at the kill point. This requires that the muzzle of the rifle R be elevated to accommodate trajectory T by aligning the bore thereof with the initial portion of the trajectory path TP, and this is accomplished, as illustrated in Fig. 2, by depressing or lowering the telescopic sight aiming point, which may be of the Lee floating dot type comprising a globule of lacquer at the crossing point of two right-angularly related hairs of such fineness as to be unobservable in the image field and supported by a movable reticle frame. Thus, the telescopic sight K must have its front end raised with the muzzle of the firearm R so that its axis is substantially aligned with the trajectory path TP. Accordingly, the aiming point will be depressed from its initial axial position AP1, indicated in dotted lines, to its full line position AP2 on the straight dot-dash line of sight, as there illustrated. Such reticle means, constituting the aiming point AP, of course, must have its focused appearance located at a focal point and its adjustment linear motion for accommodating trajectory is to be maintained in the focal plane at that focal point and thus transverse of or substantially normal to the axis of the telescope. As hereinafter explained and as understood in the art of optics, a two-lens system, consisting of an objective and an eye-piece lens, has only one focal plane located behind the objective at a distance the focal length of the objective and in front of the eye-piece lens a distance equal to the focal length of the latter; but if an erector lens assembly is to be employed between the objective and the eye-piece lens for producing the virtual image erect rather than inverted, two focal planes are formed, one intervening the objective and the erector lens assembly and the other between the erector lens assembly and the eye-piece lens, permitting physical location of any reticle means, including the aiming point reticle, to be physically located either at the focal plane of the eye-piece lens or at the focal plane of the objective for refractive transfer of its image to the eye-piece lens focal plane so that in either case the focused appearance of such reticle means will be in the latter focal plane. Further, since the axis of the telescopic sight is offset from (above) the bore of the firearm, this vertical height difference must be taken into account in mounting the telescopic sight upon the firearm. However, for all practical purposes of illustration, particularly since such difference is very small in relation to the ranges at which such telescopic sight-equipped firearms are used, it may be considered that the telescopic sight axis substantially coincides with the bore of the firearm, which has been assumed in the schematic and diagrammatic illustrations in Figs. 1 and 2.

Various means have been provided in the prior art for so adjusting the aiming point AP, and one embodiment of the present invention which has been found to be practical employs cam means for this purpose, such as that illustrated in Fig. 3. As there shown, the telescope barrel 21 may have housed therein suitable aiming point reticle means for transverse motion in a focal plane and such may include a side pin 22 fixed to its frame and projecting out through a transverse side slot 23. A suitable rotary cam 24 is pivotally mounted at 25 to the side of the telescope barrel 21 which, if desired, may be accomplished by pivotally mounting it to the saddle employed as a mount (not shown) for securing the telescope above the firearm barrel. The rotary cam 24 may be provided with a suitable cam track against which pin 22 is to ride as a follower by forming an arcuate slot 26 therein. As will be more fully explained later, such cam track as provided by arcuate slot 26 must be spirally shaped, as shown in Fig. 3, in accordance with certain mathematical and geometrical relationships, so as to accommodate the trajectory of any particular ammunition of certain characteristics, as is well understood in the art. Since the mechanism for moving or adjusting the position of the aiming point is to be coupled to for automatic synchronization with mechanism for adjusting the framing reticle means, such as, for example, by being geared thereto, rotary cam 24 preferably is provided at least about an arcuate section of its circumference with suitable gear teeth 27.

As is schematically illustrated in Figs. 4 and 5, the image field of the telescope may be provided with images of framing reticle means which may be in the form of cross hairs with one being relatively fixed and having its focused appearance FH located below the telescope axis and the other having its focused appearance MH located above and adapted to be moved up and down relative to FH to vary the apparent spacing therebetween for suitably framing a target O of an image height of S1. In accordance with the optical fundamentals of a telescope, if the target O appears to be of a height S1 when it is at a range of one hundred yards, the same target will appear to be one-half that height at two hundred yards and one-third that height at three hundred yards, etc. As a practical matter, the firearm and its mounted telescopic sight will be pre-set or zeroed in at a certain range, such as one hundred yards, so that at that range, with the focused appearances of the reticle means framing the target, the aiming point will accurately mark on the target the kill point. Most targets are familiar objects of known average or typical heights and, by way of example, it may be assumed that the target O is a Kodiak bear which when erect may be about nine feet tall, Fig. 4 illustrating the framing of such target at one hundred yards. If such target O is at a range of two hundred yards, the observed image may be of the form schematically illustrated in Fig. 5 with the height S2 of the target image being one-half the height S1 of the target image at one hundred yards. Thus, for framing the movable hair must be moved down from the full line position MH1 in the direction of the arrow to the dotted position MH2 in Fig. 5. Prior practice has provided a calibrated dial in association with suitable mechanism for so adjusting the movable reticle means or movable hair MH from which the range may be read. This then requires that the gunner or shooter then make time-consuming and intricate computations to determine how much elevation he must give to his firearm for accommodating the trajectory thereof so as to attain a kill. This involves knowledge of ballistic tables which few shooters have and, in any event, careful thinking, which is difficult under stress of excitement, is required. In accordance with the present invention, it will be seen that embodiments of this device couple with the aiming point adjusting mechanism, such as that schematically illustrated in Fig. 3, the mechanism to adjust the focused appearance of the movable framing reticle means relative to the focused appearance of the relatively fixed framing reticle means so that the aiming point adjustment is synchronized with the framing operation. This may be accomplished by locating the relatively fixed framing reticle means or fixed hair FH and the movable framing reticle means or movable hair MH in the same focal plane as the aiming point AP is located, and with the aiming point adjusting pin 22 of Fig. 6 riding in the cam slot 26 of the rotary cam 24.

With that aiming point adjusting mechanism of Fig. 6 is associated suitable other mechanism to give linear or straight line motion to the movable hair MH which is suitably supported by a movable reticle frame within the scope barrel 21 carrying a lateral pin 28 extending out through a transverse side slot 29 which is aligned with the side slot 23 for the aiming point follower 22 and which, if desired, may form a continuation thereof. Lever means L is provided which, when swung, moves the movable hair reticle frame pin 28 up and down in the transverse side slot 29. Preferably, the lever L and the reticle pin 28 form, together with a power application point PP and a fulcrum pin FP, parts of a parallel motion device and thus the power application point in the form of a lateral pin 30 is slidably mounted in a transverse slot 31 which is arranged substantially parallel to the plane of motion of the aiming point AP and the movable hair MH, being spaced appreciably therefrom axially of the telescope barrel 21, as illustrated in Fig. 6. The lever L may be in the form of a straight lever of the first class 32 provided with a longitudinally-extending slot 33 in which the movable hair pin 28 and the power pin 30 are slidably engaged to permit the inherent change of lengths of the lever arms on opposite sides of the fulcrum point FP during the swing of the lever which adjust the position of the movable hair MH. Preferably, the fulcrum point is provided by a third pin 34 which is also engaged in the longitudinal slot 33 of the lever 32 and thus the latter is connected to three pivot means provided by the three pins 28, 30 and 34. It will also be noted that the lever means L comprising lever 32 is oriented obliquely with respect to the planes of motion of the movable hair pin 28 and the movable power pin 30 so as to assure compactness of the mechanism and a practical accommodation of other parts thereof. In order to raise the power pin 30 to swing the lever 32 to lower the movable hair pin 28 cam means are preferably provided which, as indicated in Fig. 6, may be in the form of another rotary cam disc 35 pivotally mounted at 36 and provided with a cam track by means of a spiral slot 37 in which the power pin 30 is slidably engaged to serve as a cam follower. In order to synchronize the adjustment or depression of the aiming point AP with the adjustment motion for lowering the movable hair MH relative to the fixed hair FH, the two cam discs 24 and 35 are geared together, which may be accomplished by providing an arcuate section of the circumference of the latter with gear teeth 38 meshed with the gear teeth 27 of the former. It will be understood, of course, that the cam discs 24 and 35 may be geared together by other well-known suitable means, such as intervening idler spur gears if it is desired to space the cam discs farther apart, one such interposed idler gear requiring, of course, reversed direction of the cam track of one of the cam discs.

The geometrical relationship of the parts of the mechanism illustrated in Fig. 6 is diagrammatically shown in Fig. 7, wherein it is indicated the power pin at its initial position PP1 is a distance A+B from the fixed hair point FH and that the initial position of the movable hair MH1 is vertically above the latter with the three points and lever L extending from power point PP1 and movable hair point MH1 constituting a right-angled triangle. As therein shown, the ordinate distance between FH and MH1 is sub-divided into nine parts representing the height in feet of the target, for example S1 of Fig. 4. Assuming that the target O is at a range of two hundred yards with the equipped firearm zeroed in at one hundred yards, the condition which is illustrated at Fig. 5, it will be seen from Fig. 7 that the lever L must be swung counterclockwise about its fulcrum point FP9 to lower the movable hair from its initial position MH1 to its adjusted position MH2 through a distance $\Delta H$ by lifting the other end of the lever connected to the power pin as a result of raising the latter from its initial position PP1 to its second position PP2 through a distance $\Delta P$. Thus, $$B \times \Delta H = A \times \Delta P$$

and $$\Delta H = \Delta P \frac{A}{B}$$

and it will be understood that such geometrical relationship obtains for such a parallel motion device, regardless of the relative locations of the three reference points FH, MH and PP, since only the vertical components of motion of the lever L are transmited to the movable hair MH by vertical motion of the power point PP, which makes it unnecessary to consider any components of the lengths of the lever arms on opposite sides of the fulcrum point FP other than the ordinate distances. In other words, the ratio of the movement of the power pin PP to the movable hair MH is determined by the ratio of horizontal distance between the plane of motion of the movable hair (which is the focal plane in which is located the focused appearance of the fixed hair FH) and the fulcrum point FP and the horizontal distance between the fulcrum point and the power pin. Thus, no matter at what angle the lever L may be oriented, a given vertical displacement of the power pin PP will always produce the same displacement of the movable hair MH for a given horizontal-distance ratio as determined by the location of the fulcrum point, such as at FP9.

While mechanism of the type illustrated in Fig. 6 will accomplish the desired simultaneous adjustments of the aiming point AP and the movable reticle means or movable hair MH, this is true only for one size of target. In order to adapt the telescopic sight of the present invention to use with various types of targets which are of typically different heights, it will be seen from the geometrical relationships illustrated in Fig. 8 that adjustment must be made of the fulcrum point FP. As there indicated, assume that the type of target is of an average height of two feet and thus at the zeroed in range of one hundred yards, the straight line representing lever L will extend from the initial power pin position PP1 to the scale unit 2 of the path of motion of the movable hair which there has an initial position MH1. Again assuming that such a two foot high target is located at a range of two hundred yards, requiring downward motion of the movable hair for suitable framing in the manner of Fig. 5 and to the position MH2 at the one foot scale unit since the image will be just half as high, it will be seen from Fig. 8 that since the power point is to move from its initial position PP1 upward the same distance to its adjusted position PP2, the fulcrum point for lever L must be moved appreciably to the left to FP2 so that the ratio of A:B is appreciably less than in the situation diagrammatically shown in Fig. 7 and as will be understood from the above formulae. This may be accomplished by fulcrum point translatable means to vary the increments of effective operation of the movable hair MH operating mechanism of the type schematically illustrated in Fig. 9.

As proposed in Fig. 9, this may be accomplished by fulcrum means which may comprise a straight target selector screw 39 which may have a right hand thread on its elongated shank, an enlarged knurled knob 40 for manual rotation and a collar 41 fixed to the screw shank to cooperate with the knob in rotatably supporting the screw in a hole in a portion of the casing for the mechanism indicated at 42 without permitting axial screw translation. The fulcrum means also comprises a travelling follower preferably in the form of a block 43 having an internally threaded through hole through which the threaded shank of screw 39 is threadably engaged, so that as the latter is rotated by its knob 40, the fulcrum block 43 will be translated axially thereof. The fulcrum pin 34 is carried by the fulcrum block 43. Thus, the screw 39 serves both as means for adjusting the position of the fulcrum point FP and as guide means to dictate motion of the latter along a certain path. The path of motion of the fulcrum point FP as attained by the screw 39 in this embodiment passes through or intersects the focal plane in which the focused appearances of the movable hair MH, the aiming point AP and the fixed hair FH are located, and at the location of the focused appearance of the latter. Also, such path of adjustment of the fulcrum point FP will be obliquely arranged with respect to the path of motion of the aiming point AP and the movable hair MH as well as the path of motion of the power pin PP in somewhat the same general orientation as depicted in Fig. 9, the reason for which will be more fully understood from Fig. 10. If the target selector screw 39 and the lever 32 are arranged substantially parallel to each other, the fulcrum pin 33 may be moved by the former longitudinally along the lever to attain the adjusted conditions of Fig. 8 in comparison with the Fig. 7 conditions. However, under such conditions there will be no adjustable motion of the movable framing reticle means or movable hair MH with adjustment of the position of the fulcrum point FP and such simultaneous adjustment is, of course, necessary as will be understood from a comparison of Figs. 7 and 8. Also, should the path of adjustment motion of the fulcrum point FP be arranged substantially normal to the longitudinal axis of the lever L, operation of the target selector screw 39 would attain adjustment of the position of the movable hair MH but would not suitably adjust the position of the fulcrum point FP. Thus, the path of adjustment motion of the fulcrum point FP in this form of the device is along some line extending through the FH position and intermediate of a line parallel to the lever axis and a line normal thereto.

The proper position of the path of fulcrum point FP adjustment with respect to any three selected locations of the reference points MH, FH and PP readily may be determined geometrically, as will be understood from Fig. 10. As therein indicated, assume a transverse path of motion in a focal plane of the focused appearance of the movable hair, indicated at MH, down toward the location of the focused appearance of the fixed hair, indicated at FH, through a scale of nine units representing the height of an image of a target nine or less feet in height and with the power point PP1 located to the right of the FH point at 90° to the focal plane. In Fig. 10, the various positions of the lever L, L1, L2, L3, L4, L5, L6, L7, L8 and L9 are shown in full lines radiating from the power point PP1 to the respective height scale units and on each of those full lines representations of lever positions are located the respective fulcrum point positions, which are necessary to give at each different location the proper ratio of lengths of lever arms, in accordance with the geometrical relationships illustrated in Figs. 7 and 8 and the formulae indicated above in connection therewith. If we assume that the apparent spacing between the fixed hair FH and the movable hair MH is one unit, there will be accurately framed therein a target one foot in height at a given zeroed in range, such as one hundred yards. If the increment of motion of the power point PP at this zeroed in range is one unit, then the ratio of the lengths of the lever arms on opposite sides of the fulcrum point FP will be 1:1 with the fulcrum point in the center of the lever length extending between scale mark 1 and PP1. If it is desired to frame a two foot target at the same range, the ratio of lengths of the lever arms on opposite sides of the fulcrum point FP will be 2:1, i. e., the fulcrum point will be at a location ⅓ the distance from the power point PP to the two foot scale mark 2. As a result, the following table may be set up:

| Target size (ft.) | Lever ratio | Fulcrum position from (PP) (fraction of total lever length) |
|---|---|---|
| 1 | 1:1 | ½ |
| 2 | 2:1 | ⅓ |
| 3 | 3:1 | ¼ |
| 4 | 4:1 | ⅕ |
| 5 | 5:1 | ⅙ |
| 6 | 6:1 | ⅐ |
| 7 | 7:1 | ⅛ |
| 8 | 8:1 | ⅑ |
| 9 | 9:1 | ⅒ |

By laying out the respective positions of the fulcrum point on the various positions of the lever in Fig. 10 in accordance with this table, it will be found that the fulcrum positions lie in a straight line which intersects the FH location and this indicates the proper angular orientation of the path of the fulcrum point FP path 1 along which the fulcrum point is to be moved by the target selector adjusting means, such as the screw 39 of Fig. 9.

By further reference to Fig. 10, it will be seen that there is no particular critical location of the power point PP with respect to the other two reference points MH and FH, except as may be dictated by size of mechanism parts and available space in which they are to be physically arranged. For example, assume that the power point is located at PP2 below the horizontal line passing through the FH location. It is indicated in Fig. 10 that now the fulcrum points laid out on the dotted line lever positions extending from the PP2 point to the FH—MH scale units again are arranged in a straight line which intersects the FH position defining a different path of adjustment of the fulcrum point, i. e. FP path 2. It is also assumed in Fig. 10 that the power point is moved upwardly to a position approaching a horizontal plane through the MH location, such as at PP3. It there appears in dot-dot-dash lines that again the fulcrum points, as laid out on the lever positions in accordance with the above table, are arranged in a straight line intersecting the FH position to define a straight line path of fulcrum point adjustment FP path 3. Likewise assume conditions similar to the first set of conditions but with the power pin in a horizontal plane closer to the FH location, such as at PP4. It is there indicated in dot-dot-dot-dash lines that when the fulcrum point locations are laid out on the various lever positions in accordance with the above table, they are arranged in a straight line which also intersects the FH location, thus defining a straight line path of fulcrum adjustment FP path 4. Thus, the proper orientation of the path of adjustment of the fulcrum point FP of the lever L for any given set of conditions of locations of the three reference points MH, FH and PP, is determined by the latter.

The target selector means or screw 39 may be provided with suitable index means, such as that schematically illustrated in Fig. 9 as comprising a straight line scale 44 traversed by a pointer 45 carried by the fulcrum block 43. With such mechanism a pre-shoot setting may be attained by the shooter upon recognition of the type of target and his knowledge that it is of a certain average height. He then rotates the target selector screw 39 by its knob 40 to bring the pointer 45 to the scale marking which represents such known average height of such a typical target. The shooter is then ready to sight in the target with the telescopic sight, adjusting the position of the cam disc 35 to raise the power pin 30 sufficiently to swing the lever counterclockwise about the adjusted position of the fulcrum pin 34 for depressing the movable framing reticle means or movable hair MH so that the image of this particular target is precisely framed in the image field between the images of the relatively fixed framing reticle means or fixed hair FH and the movable framing reticle means or movable hair MH. This, of course, can be accomplished by manually rotating either of the two meshed cam discs 24 and 35 which are geared together, either by direct manual contact with either one or through suitable rotating means, such as a knurled knob fixed upon the shaft of either of these two cam discs.

A practical embodiment of the device somewhat schematically illustrated in Fig. 9 is shown by way of example in Figs. 11 to 15 incl. As therein indicated and more particularly with respect to Figs. 11 and 14, the device may be suitably housed in a casing 46 which is suitably mounted to one side of the telescope barrel 21, such as by means of an encircling strap 47. The casing 46 has a front panel 48, a top panel 49, and a back end panel 50 as well as other panels necessary to enclose in a substantially dust-free manner the operating mechanisms. In that embodiment, it is intended that the three reticle means comprising the fixed hair, the aiming point and the movable hair be substantially located in one focal plane and thus adapted for use in either a two-lens telescope system, consisting of the objective and the eye-piece lens means, or a three-lens telescope system, consisting of the objective, the eye-piece lens means and an intervening erector lens assembly. The fixed hair, of course, requires no elaborate reticle frame but, as shown, the movable hair reticle frame MHF, indicated at 51, and the movable aiming point reticle frame APF, indicated at 52, may, if desired, be in the form of rectangular frames each respectively having wedge-shaped vertical edges 53, 53 and 54, 54, suitably guided for vertical motion, i. e., motion substantially in the focal plane normal to the telescope axis, by laterally spaced pairs of grooved rolls 55—55 for free up and down motion of the reticle frames. The movable hair reticle frame 51 will support the movable cross hair MH on its far face and the aiming point reticle frame 52 will carry on its near face a fine cross hair 56 upon which is supported the aiming point globule AP so that when those frames are mounted side-by-side in close juxtaposition, the movable hair MH and the aiming point hair 56 with its globule AP will be arranged for transverse motion substantially in the focal plane.

The movable hair reticle frame 51 has attached thereto a bracket 57 carrying the movable hair pivot pin 28 and the aiming point reticle frame 52 has a similar bracket 58 mounted thereon carrying the aiming point pin 22.

In the Figs. 11 to 15 incl. embodiment, the aiming point rotary cam disc 24 is rotatably supported by its hub 25 which, as will be seen from Fig. 11, is mounted on the front casing panel 48 and extends inwardly from the inner face thereof in the form of a stub shaft. The rotary cam disc 24 is provided with spiral slot 26 which slidably receives therein the aiming point reticle pin 22 and its circumferential edge is provided with gear teeth 27. The other rotary cam disc 35 is similarly supported on the casing front panel 48 by means of another stub shaft 36 and has spiral slot 37 in which rides power pin 30. As will be understood from Figs. 11, 12 and 13, the power pin 30 preferably extends through the spiral slot 37 and carries on its outer end a roller 59 slidably mounted for vertical motion in an elongated guide 60 mounted to the inner face of the casing front panel 48 for linear translation thereof. The inner end of power pin 30 has fixed thereto one end of lever 132 with the latter provided with an elongated slot 133 extending from the vicinity of pin 30, as is best seen in Fig. 12, to the far end slidably to receive therein the fulcrum pivot pin 34 and the movable hair reticle frame pin 28. The fulcrum pin 34 is carried by a translatable fulcrum block 143.

Preferably, the casing top panel 49 and the casing end panel 50 respectively support suitable brackets 61 and 62, each respectively supporting one of a pair of guide rods 63, 63 with said guide rods slidably received through transverse holes in fulcrum block 143. The fulcrum block 143 also has an internally-threaded transverse hole extending therethrough in which is threadably engaged the external threads of a screw shaft 139 so that in rotation it will move the fulcrum pin 34 along a straight line path intersecting the location of the fixed hair. The outer end of the screw shaft 139 preferably is rotatably supported by a thrust bearing 64 mounted through the end wall 50 and carries fixed thereto a bevel gear 65 meshed with a complementary bevel gear 66 fixed upon a vertical shaft 67 rotatably supported by an extension 68 of bracket 61 and the top casing panel 49 through which it extends, as will be seen from Figs. 12 and 14. The upper end of the vertical shaft 67 is provided with a knurled manual knob 69 which is fixed thereto for rotation of that shaft so as to rotate screw shaft 139 through bevel gears 65 and 66. This constitutes the manual means for operating the adjusting means which varies the increments of effective operation of the parallel motion mechanism connected to the movable hair reticle frame 51. The meshed rotary gear cams 24 and 35 preferably are manually operated by a knurled knob 70 fixed upon an extension of the stub shaft 36 which extends through the casing front panel 48 and carries fixed thereto the rotary cam disc 35.

As will be seen from Figs. 11 and 12 and best understood from Fig. 15, the enlarged manual knob 69 for adjusting the target selector screw 139 is provided with index means in the form of a spiral slot 71 provided in its bottom face slidably to receive therein for riding engagement the upwardly-extending foot 72 of an L-shaped slide 73 constituting a movable pointer element and slidably supported in the radial guide 74 mounted beneath the knob upon the top face of casing top panel 49. Thus, when the manual knob 69 is rotated, the foot 72 of the slide 73 will ride in the spiral groove 71 and in doing so, will move inwardly along the guide slot 74. The manual knob 69 is made of transparent material, such as a suitable plastic, so that the position of the index slide 73 may be observed therethrough and the top face of the knob carries suitable index markings arranged along the spiral groove 71 associated with proper numerals to indicate target height in feet. The radial distances between the numerals and associated markings on the face of the manual knob 69 are readily determined by calculations of the angular relationships thereof from the preceding table, which indicates fractions of total lever length for the certain lever ratios necessary for targets of certain heights, in connection with the geometrical relations depicted in Fig. 10.

In operation of the embodiment illustrated in Figs. 11 to 15 incl., the shooter, having a rifle equipped with the telescopic sight illustrated therein, may observe a target at some unknown range, which he recognizes as being one of a normal average height of, say, about six feet. He then rotates manually the dial knob 69 to bring the dial marking "6" thereof opposite the pointer slide 73 which, through the beveled gears 65 and 66, properly rotates the target selector screw 139 the right amount to position the fulcrum pin 34 at the proper location for that particular height of target. The shooter then sights through the telescopic sight at the target and in observing the virtual image of the latter in the image field, raises the firearm until the virtual image of the fixed framing hair is aligned with the bottom of the target and rotates the knob 70 in a clockwise direction to adjust the virtual image of the movable framing hair downwardly until it is aligned with the top of the virtual image of the target so that the latter is accurately framed between the virtual images of two framing hairs. Such rotation of the knob 70 rotates the cam disc 35 in a clockwise direction to translate linearly the power pin 30 upwardly so as to depress by means of the lever 132 the movable hair reticle frame 51 for the proper framing. Since the rotary cam disc 35 is geared to the rotary cam disc 24, the latter is rotated in synchronism with the former so as to move the aiming point reticle frame 52 downwardly to depress the aiming point AP just the right distance to assure that, with the aiming point aligned with the kill point of the target as determined by the shooter's judgment, the muzzle of the firearm will be elevated just the right amount to accommodate trajectory at the unknown range of the target and a hit will be scored when he shoots.

Other types of index means may be employed for pre-shoot adjustment of the telescopic sight mechanism to the judged height of the recognized target, such as that proposed in Figs. 17 and 18. As indicated in Fig. 17, the index means may be in the form of a dial on the inner face of the casing front panel 148 provided the latter is made of transparent material and, in fact, the entire housing casing 146 may be formed or molded from suitable transparent plastic for this purpose. Thus arcuate dial scale 75 may be laid out directly on that inner panel face. Assuming a condition where the fixed hair location and the power pin location are in a horizontal plane substantially normal to the focal plane in which the fixed hair and movable hair have their focused appearances, a line may be drawn from the FH—PP ordinate line substantially normal to the fulcrum point path FP path and at a point where it strikes the arcuate dial 75 the nine foot mark may be provided. The intersection of that line with the ordinate line FH—PP may constitute the point about which the arcuate index scale is described and also the pivot point HP for index hand 76 which is to sweep along the arcuate index scale. The index hand 76 is slidably engaged by a projection connected to the fulcrum pivot means and may constitute an extension of the fulcrum pivot pin 134 which may be slidably engaged in an elongated slot 77 extending longitudinally of the index hand 76. Thus, lines drawn respectively through the fulcrum points along the fulcrum point path FP path for the respective lever positions described for the various unit target heights will define on the arcuate scale 75 the markings for the various target heights increments. It will be seen from Fig. 17 that the distances between the successive markings on the arcuate index scale 75 approach equidistant spacing, as distinguished from the gradually increased spacing from an initial quite small spacing of other types of index, such as that illustrated in Fig. 15, and thus may assure more accurate reading in pre-shoot target selector adjustment. The incorporation of such an index means requires a rearrangement of parts which generally consists of a substitution of the relative positions of the lever 132 and the rotary cam discs 24 and 35 with respect to the target selector screw shaft 139 so that the lever 132 will be mounted between the index hand 76 and the fulcrum block 143 with its translating mechanism. Such rearrangement of the parts necessitates means for bypassing the rotary cam 24 which will allow the lever 132 fully to depress the movable hair reticle frame. As proposed in Fig. 18, such bypassing means may be in the form of a vertical slide 78 suitably guided in a slotted elongated boss 79 on the inner face of the front end wall 80 of the housing casing 146 for slidable up and down movement with the slide carrying on the side adjacent the lever 132 an arm 81 carrying a pin 82 slidably received in the elongated slot of the lever, and on the other side behind the rotary cam disc a second arm 83 connected to the movable hair reticle frame pin 28. In other respects the structure of the embodiment of Figs. 17 and 18 may be similar to that of Figs. 11 to 14 incl. with their operations being of a like nature and, of course, in this case a much smaller manual knob may be geared to the target selector screw shaft 139. As shown in Fig. 18, pointer hand 76 is pivotally mounted about the HP axis preferably by means of a riveted pin 84 extending through the transparent front panel 148 of the housing casing 146, providing a dust-barring seal at that point.

As illustrated in Fig. 16, an embodiment of the telescopic sight of the present invention need not be limited to the employment of framing reticle means in the form of cross hairs. For example, the relatively fixed reticle means may be in the form of a fixed upwardly-extending point 85 and the movable framing reticle means may be in the form of another point 86 suitably carried by movable reticle supporting means for movement toward the framing reticle point 85.

In Fig. 19 certain optical principles are diagrammatically illustrated from which it will be seen one may calculate the distance $d$ of the image $a$—$b$ from the lens W when the object distance or range D of target O from the lens and the focal length $f$ of the lens are known, since

[1] $$\frac{1}{d} = \frac{1}{f} - \frac{1}{D}$$

and the object size S and image size $s$ are proportional to their respective distances from the lens W, or

[2] $$\frac{S}{D} = \frac{s}{d}$$

It will be understood from Equation 1 that when the object distance or range D is large as compared to the focal length $f$ of the lens W, as is the case with telescopic sights for direct fire gunnery which are usually of the magnitude of a hundred yards and greater while the focal length of the objective is usually only a few inches, the factor $$\frac{1}{D}$$

is so comparatively small that for practical purposes it may be disregarded. This provides the conclusion that the object distance D is for practical purposes substantially equal to the lens focal length $f$ which permits Equation 2 to be written

[3] $$\frac{S}{D} = \frac{s}{f}$$

and this latter equation can be expressed as

[4] $$s = \frac{Sd}{D}$$

This Equation 4 can also be employed for calculating elevational corrections of the aiming point AP to accommodate trajectory T, considering S' as the required elevational correction at a given range and $s'$ as such movement of the aiming point which will effect the elevational correction. By the use of this formula $$s' = \frac{S'd}{D}$$

the contour of the polar co-ordinates curve of the cam track provided by the spiral slot 26 of rotary cam disc 24 may be laid out with reference to data provided by firearms manufacturers for any particular cartridge. The values of $s'$ so determined are the amounts to be subtracted at various increments of range from the radius of a circle described about the axis at 25 of the rotary cam disc 24 through the aiming point pin 22 at zeroed in position, e. g., its position at 100 yards range. For example, the Winchester Ammunition Handbook gives the following values for S' at various ranges for a 30–06, 150 grain full patch cartridge with the use of a telescopic sight in which the objective has a focal length $f$ of three inches, and the following values of $s'$ are calculated with the use of these values and this formula:

| Range D | Data S' | Objective focal length $d$ | AP Correction $s'$ |
|---|---|---|---|
|  | in. | in. | in. |
| 100 yds | 0 | 3 | 0 |
| 200 yds | 4.8 | 3 | 0.0020 |
| 300 yds | 15.2 | 3 | 0.0042 |
| 400 yds | 33.1 | 3 | 0.0069 |
| 500 yds | 59.0 | 3 | 0.0098 |

It will thus be seen that from such calculated values of $s'$ the contour of the polar co-ordinates cam track for the rotary cam disc 24 for any given firearm using any particular ammunition and equipped with a certain telescopic sight having a particular objective of known focal length may be laid out. The polar ordinates of this curve represent range and the polar abscissae represent aiming point adjustments. It will be found that if this polar co-ordinates curve is translated to a rectangular co-ordinates curve the latter is a reversed concave curve with the rate of slope gradually decreasing as it proceeds from maximum range toward zeroed in range, and thus with the rate of aiming point depression being gradually decreased. If such geometrical relations are employed to lay out the aiming point polar co-ordinates cam track the contour of the polar co-ordinates cam track provided by spiral slot 37 of rotary cam disc 35 is to be of uniform slope at all radii so that if laid out as a rectangular co-ordinates curve with values of the ordinates units representing increments of lift of the power pin PP to effect by swing of the lever L framing depression of the movable framing reticle means MH at the various ranges D represented by the abscissa units the power pin cam track will be a straight line curve of uniform slope. The telescopic sight so equipped with such aiming point adjustment rotary cam may be adapted for use on any other firearm using a different particular ammunition by substituting for that cam another designed for use with the latter ammunition in like manner.

The possibility of using straight line motion cam means in lieu of rotary cam means, employing rectangular co-ordinates cam track curves, is diagrammatically illustrated in Fig. 20. As there indicated, a cam slide 87 may be provided, suitably guided for longitudinal motion, such as at 88 and 89, along a line parallel to the telescope axis. The cam slide 87 preferably carries a toothed rack 90 meshed with a rotary spur gear 91 which is manually rotatable by any suitable means, such as crank 92, for longitudinal translation of the cam slide. The cam slide 87 carries a cam wedge 135 provided with a straight line rectangular co-ordinates cam track 137 against which a follower 93 connected to the power pin 30 may ride. The cam slide 87 also carries another cam wedge 124 which is reversed with respect to the cam wedge 135 and has a concave rectangular co-ordinates cam track 126 against which a cam follower 94 connected to the aiming point pin 22 rides. The employment of L-shaped slides 95 and 96 respectively connecting the cam follower 93 to the power pin 30 and the cam follower 94 to the aiming point pin 22 has been proposed in Fig. 20 solely for the purpose of avoiding confusion in the showing since, of course, the power pin 30 or a roller on its axis may ride directly against the cam track 137 and the aiming point pin 22 or a roller on its axis may ride directly against cam track 126.

In operation of the embodiment illustrated in Fig. 20, when the location of the fulcrum point pin 34 has been properly adjusted, such as by means previously proposed, e. g., the target selector screw shaft 139 of the Figs. 11 to 15 incl. embodiment, the shooter sights the target through the telescope and by turning the crank 92 clockwise adjusts the position of the movable hair MH so as to frame between the virtual images of it and the fixed hair FH the virtual image of the target. Such manipulation of the crank 92 translates the cam slide 87 to the right as observed in Fig. 20, thereby causing the cam track 137 to lift follower 93 and the power pin 30 therewith accompanied by counterclockwise swing of the lever 32 about the fulcrum pin 34 to depress the movable hair MH to framing position. Simultaneously, the aiming point AP is depressed by suitable means, such as a compression spring 97, which causes the cam follower 94, connected to aiming point pin 22, to ride down the cam track 126 as the latter is translated to the right by slide 87. Thus, the cam 135 which operates the power pin 30, e. g., lifts it against a suitable biasing force, such as that which may be provided by another compression spring 98, is coupled in a synchronized manner with the cam 124 which permits automatic depression of the aiming point pin 22 by the associated biasing spring 97.

As has been previously indicated, the purpose of the present invention may be incorporated in either two-lens or three-lens telescope systems and, as is illustrated in Fig. 21, with the employment of such a three-lens system there are two focal planes FP1 and FP2 in which the three reticle means consisting of the movable framing reticle MH, the relatively fixed framing reticle FH and the aiming point reticle AP may be located. As there indicated, the telescope K may have an objective W, an erector lens assembly E, and an eye-piece lens means J providing the two focal planes FP1 and FP2 respectively at the focal lengths of the objective and of the eye-piece lens means. Thus, in observing an object O through a telescope, an inverted image I1 will be formed at the first focal plane FP1 and a second erected image I2 will be formed at the second focal plane FP2. Thus, an image of any element appearing in the first focal plane FP1 will have a focused appearance in the second focal FP2 and there will be formed an assembled virtual image including all of the elements located at both focal planes. Accordingly, if a telescopic sight of the present invention is provided with all of the reticle means FH, MH and AP physically located in either of the two focal planes FP1 and FP2, they will appear in the virtual image. Also, if some of those reticle means are located in one of the focal planes and others thereof located in the other focal plane, they will all appear in assembled relation in the virtual image. Consequently, this principle provides means whereby crowding of elements of the device of the present invention in a single focal plane may be avoided. For example, the fixed hair FH may be located in the first focal plane FP1 above the axis of the telescope at the top end of the inverted image I1 so that a fixed appearance thereof will be present at the bottom of the erected image I2 at the point IFH in the second focal plane and with the aiming point and the movable hair respectively located at the AP and MH points in the second focal plane in the indicated manner all three of these reticle means will appear in proper assembled relation in the virtual image respectively at VFH, VAP and VMH as shown. Thus, it will be understood that embodiments of the present invention may have the target selector path intersecting the actual physical location of the relatively fixed framing reticle means FH in the second focal plane FP2 or an image thereof IFH transmitted from the point FH in the first focal plane FP1 and in either event such target selector path may intersect the second focal plane FP2 at the focused appearance point of FH therein.

In order to simplify index mechanism the scale thereof may be placed in the image field in the telescope such as in the form of an arcuate side scale having vertical spacings between scale units and located in a focal plane to provide an image thereof as a marginal zone along one arcuate side of the circular field of vision. Thus when the fulcrum point is adjusted for the target of known different size the image of the movable hair will move up or down along this scale as a pointer due to the movable hair adjustment resulting from the pre-shoot fulcrum point adjustment as previously explained. For example, assume that there is located in a focal plane of the telescope within the casing of the latter an arcuate side strip of transparent material having laterally-extending, vertically-spaced scale markings thereon numbered successively from "1" to "9" incl. and so spaced and located in the telescope that when the fulcrum point is adjusted to the proper position for reticle framing of a particular target of an average height of a certain number of feet at zeroed in range of one hundred yards the image of the movable hair will be seen in the image field as crossing the image of the scale at the numbered scale height mark representing the typical height of such target. If the fulcrum point has an initial setting to cause the framing reticles precisely to frame a nine foot target at one hundred yards in the image field and the shooter recognizes the target as one which is typically five feet high he will adjust the position of the fulcrum point as a pre-shoot condition until the image of the movable hair is depressed to the five foot mark of the scale image as observed in the telescope. Then if the image of this target is not precisely framed between the fixed hair and movable hair images the shooter knows that range adjustment must be made by manipulating the cam mechanism which moves the movable hair image further to precise framing position which automatically gives the correct adjustment to the aiming point to accommodate the trajectory at the unknown range.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A telescopic sight comprising, in combination, a telescope including a barrel having therein an objective and eye-piece lens means providing therebetween at least one transverse focal plane in which an image is to be formed, at least three reticle means mounted in said telescope in positions having focused appearances in said focal plane, one of said reticle means being relatively fixed at a point offset to one side of the axis of said telescope to serve as one of a pair of framing reticle means with its focused appearance located in said focal plane below the axis of said telescope, a second of said reticle means being movably mounted for linear motion in a transverse plane to position its focused appearance above and move it up and down with respect to the focused appearance of said relatively fixed reticle means and thus to serve as the other of said pair of framing reticle means, a third of said reticle means being movably mounted for motion in a transverse plane to serve as an adjustable aiming point whereby the latter may be depressed to accommodate increased trajectory at increased ranges, and means fixedly to mount said telescope barrel on a gun barrel with the optical axis of the telescope maintained at a determined angular relation to the bore of the gun barrel; mechanism to depress and raise said aiming point in its transverse plane of motion at predetermined increments of motion, other mechanism to move said movable framing reticle means in its transverse plane of motion at certain determined increments of motion for varying the apparent distance between its focused appearance and the focused appearance of said relatively fixed reticle means, and a single manually operable control connected to both said mechanisms simultaneously to depress said aiming point and adjust the position of said movable framing reticle means with movement of the focused appearance of the latter toward the focused appearance of the relatively fixed reticle means in a focal plane for framing a target of given size at increased ranges at relative predetermined increments of motion so that when the image of a known target is framed at any unknown range the focused appearance of said aiming point automatically is adjusted to indicate the hit point at the unknown range.

2. A telescopic sight comprising, in combination: a telescope including a barrel having therein an objective, an eye-piece lens means and erector lens means located between the latter and said objective substantially axially aligned along the axis of said telescope with definition of one focal plane located between said objective and said erector lens means and a second focal plane between the latter and said eye-piece lens means; means fixedly to mount said telescope barrel on a gun barrel with the optical axis of the telescope maintained at a determined angular relation to the bore of the gun barrel; at least three reticle means mounted in said focal planes having focused appearances in said second focal plane, one of said reticle means being relatively fixed in one of said focal planes offset to one side of said telescope axis to serve as one of a pair of framing reticle means with its focused appearance located in said second focal plane below the axis of said telescope, a second of said reticle means being movably mounted for straight line transverse motion in one of said focal planes to serve as the other of said framing reticle means with its focused appearance located in said second focal plane above the focused appearance of the relatively fixed framing reticle means for up and down motion relative to the latter, a third of said reticle means being movably mounted for straight line transverse up and down motion in one of said focal planes to serve as an adjustable aiming point with its focused appearance movable toward and away from the focused appearance of said relatively fixed framing reticle means with simultaneous similar directional motion of the focused appearance of said movable framing reticle means; lever means connected to said movable framing reticle means to give it the straight line transverse motion at predetermined increments of motion; translatable cam means connected to said aiming point reticle means to give it the other straight line motion at certain determined increments of motion, said cam means being also connected to said lever means providing synchronized coupling thereof simultaneously to swing the latter for so moving said movable framing reticle means and so moving said aiming point reticle means at determined relative increments of motion; and a single manually operable control for translating said cam means, whereby the focused image of the aiming point accurately indicates the hit point on the image of the target framed by a pair of framing reticle means.

3. The telescopic sight as defined in claim 2 characterized by said lever means as being a parallel motion device comprising a swinging lever of the first class, first movable pivot means at one end of said lever comprising the connection to said movable framing reticle means, second pivot means intermediate the ends of said lever constituting the fulcrum point thereof, third movable pivot means at the end of said lever comprising the connection to said cam means, and means to guide said first and third pivot means in substantially parallel transverse axially-spaced straight line paths of motion, said lever being obliquely oriented with respect to said straight line paths of motion of said first and third pivot means and longitudinally translatable with respect to at least two of said three pivot means to permit in its swing automatic change of lengths of the arms of said lever on opposite sides of the fulcrum point.

4. The telescopic sight as defined in claim 3 characterized by said lever being longitudinally translatable with respect to said second pivot means which constitutes the lever fulcrum point as well as with respect to at least one of the other two pivot means, means to move and guide said second pivot means along a path angularly related to the longitudinal axis of said oblique lever, said path intersecting the focal plane of focused appearance of said plurality of reticle means substantially at the focused appearance of said relatively fixed framing reticle means, manual means to adjust the position of said fulcrum pivot means along its angular path, and index means connected to said fulcrum pivot means to dictate pre-shoot adjustment of the latter to a known target size, whereby after such pre-shoot adjustment said cam means may be manually operated visually to frame the target between the focused appearances of said relatively fixed and movable framing reticle means by swing of said lever with automatic synchronized adjustment of the focused appearance of said aiming point by the rotation of said cam means for accommodation of trajectory at the existing target range.

5. The telescopic sight as defined in claim 4 characterized by location of said aiming point and movable framing reticle means in the same focal plane for straight line transverse motion therein with at least an image of said relatively fixed framing reticle means constituting the focused appearance thereof located in this same focal plane, said cam means comprising a pair of cam surfaces spaced axially of said telescope barrel and connected together for simultaneous translation with one connected to said aiming point reticle means for up and down trajectory adjustment of the latter and the other connected to the third pivot means of said lever for framing swing of the latter.

6. The telescopic sight as defined in claim 5 characterized by each of said cam surfaces being provided as a rotary cam having a spiral track to provide a pair of spiral cam tracks, said aiming point reticle means carrying a cam follower riding against one of said spiral tracks and said third pivot means of said lever carrying another cam follower riding against the other of said spiral tracks.

7. The telescopic sight as defined in claim 5 characterized by said fulcrum pivot means moving and adjusting means as comprising a straight elongated screw having its axis oriented substantially parallel to a straight line path aligned with the focused appearance location of said relatively fixed framing reticle means and a traversing follower threadably engaged with said screw, said fulcrum pivot means being carried by said screw traversing follower along this straight line path.

8. The telescopic sight as defined in claim 4 characterized by said index means as comprising a relatively fixed arcuate index scale, an elongated index hand pivotally mounted at a relatively fixed point to sweep said scale, and a projection slidably engaging said hand for movement therealong, said projection being connected to said fulcrum pivot means to be moved therewith along the path of the latter with slide of said projection along said hand to swing the latter.

9. The telescopic sight as defined in claim 7 characterized by said index means as comprising a relatively fixed arcuate index scale, an elongated straight index hand pivotally mounted at a relatively fixed point for sweep of said scale, said hand having an elongated slot therein extending longitudinally thereof, and a pin slidably engaged in said slot and carried by said fulcrum pivot means.

10. The telescopic sight as defined in claim 1 characterized by said aiming point operating mechanism as comprising cam means with said manually operable control being connected thereto to translate said cam means for moving said aiming point reticle means in said predetermined increments of motion, said movable framing reticle operating mechanism comprising lever means having connection at a work point with said movable framing reticle means and connection at a power application point with said control, said lever means having a movable fulcrum point to alter with motion thereof the relative lengths of the lever arm distances respectively between said fulcrum and work points and between said fulcrum and power application points, and manual means to adjust the location of said fulcrum point to vary the increments of effective operation of said lever means relative to those of said cam means for adaptation to different sized targets.

11. The telescopic sight as defined in claim 10 characterized by the connection between said control and said power application point including linear translating means movable in a transverse plane substantially parallel to the transverse plane of motion of said movable reticle means with said linear translating means being connected to said lever means for swing of the latter, said lever means being a parallel motion device comprising a lever of the first class and three pivot means providing pivotal connection thereof at the power application point in the vicinity of one lever end with said linear translating means, at the work point in the vicinity of the other lever end with said movable framing reticle means and at the fulcrum point intermediate the lever ends with said manual adjustment means; said fulcrum pivot means and at least one of the other two pivot means being slidable along said lever.

12. The telescopic sight as defined in claim 11 characterized by said transverse parallel planes of motion of said linear translating means and said movable framing reticle means being spaced apart appreciably axially of said telescope barrel with said lever being oriented obliquely to both of said planes of motion, said telescopic sight having adjustment motion of said fulcrum pivot means guiding adjustment motion of said fulcrum pivot means along a straight line path obliquely arranged with respect to said lever and intersecting the focal plane along which the focused appearance of said movable framing reticle means is moved at the location of the focused appearance of said relatively fixed framing reticle means, said defined straight line path of motion of said fulcrum means extending toward and in alignment with the location of the focused appearance of the relatively fixed framing reticle means.

References Cited in the file of this patent

UNITED STATES PATENTS

| | | |
|---|---|---|
| 2,155,389 | Arden | Apr. 25, 1939 |
| 2,155,390 | Arden | Apr. 25, 1939 |
| 2,583,042 | Dayton | Jan. 22, 1952 |